United States Patent [19]

Gray et al.

[11] Patent Number: 5,568,402
[45] Date of Patent: Oct. 22, 1996

[54] COMMUNICATION SERVER FOR COMMUNICATING WITH A REMOTE DEVICE

[75] Inventors: Dale A. Gray, Lutherville; Michael Chmilewski, Taneytown; Edward A. Bubnis, Jr., Catonsville; Michael G. Burch, Baltimore; Charles W. Heaps, Eldersburg, all of Md.; Robert M. Galante, New Freedom, Pa.; Keith A. Wancowicz, Perry Hall, Md.

[73] Assignee: GSE Process Solutions, Inc., Hunt Valley, Md.

[21] Appl. No.: 226,130

[22] Filed: Apr. 11, 1994

[51] Int. Cl.⁶ .................................................. H04B 1/00
[52] U.S. Cl. ................................. 364/514 C; 395/650
[58] Field of Search ....................... 364/514 C; 395/650, 395/909, 914, 740; 340/825.06, 825.08, 825.29; 370/95.2, 84

[56] References Cited

U.S. PATENT DOCUMENTS

| | | | |
|---|---|---|---|
| 4,642,760 | 2/1987 | Yanai et al. | 395/740 |
| 4,680,753 | 7/1987 | Fulton et al. | 370/85 |
| 4,829,298 | 5/1989 | Fernandes | 340/870 |
| 5,089,984 | 2/1992 | Struger et al. | 395/650 |
| 5,117,175 | 5/1992 | Pettigrew et al. | 323/256 |
| 5,179,701 | 1/1993 | Chisholm | 395/600 |
| 5,187,803 | 2/1993 | Sohner et al. | 455/4.1 |
| 5,237,511 | 8/1993 | Caird et al. | 364/483 |
| 5,349,580 | 9/1994 | Hester et al. | 370/84 |
| 5,355,374 | 10/1994 | Hester et al. | 370/84 |

*Primary Examiner*—Emanuel T. Voeltz
*Assistant Examiner*—Thomas Peeso
*Attorney, Agent, or Firm*—Lowe, Price, LeBlanc & Becker

[57] ABSTRACT

A method and apparatus for communication with a remote device 250 by a node system 200 and a SCADA system 100. The SCADA system 100 communicates with the remote device without protocals or characteristics of the remote device 250 or the communication channel 270 connecting the remote device to the node system. A display 250 may monitor the communication channel 270 and may be remotely located with respect to the node system 200. The node system 200 may schedule the input from the remote device 250 by setting an interval and duration so that the input may be transmitted.

5 Claims, 4 Drawing Sheets

FIG. 7

| | DIAL-UP DEVICE #1 | DIAL-UP DEVICE #2 | | | | DIAL-UP DEVICE #5 |
|---|---|---|---|---|---|---|
| CONNECTION STRING | | | | | | |
| CONNECTION TIME | | | | | | |
| REPEAT INTERVAL | | | | | | |
| CONNECTION PRIORITY | | | | | | |
| CONNECITON ATTEMPT RETRY AND TIMEOUT LIMIT | | | | | | |
| RESCHEDULE INTERNAL RETRY LIMIT & PRIORITY | | | | | | |
| CONNECTION LOCK | | | | | | |
| CONNECTION DURATION | | | | | | |
| INPUT BLOCK ACTION | | | | | | |
| AUTO DISCONNECT | | | | | | |

COMMUNICATION SERVER FOR COMMUNICATING WITH A REMOTE DEVICE

TECHNICAL FIELD OF THE INVENTION

The present invention relates to an apparatus and method for gathering information relating to status changes to be used in, for example, a supervisor control and data acquisition system SCADA.

BACKGROUND OF THE INVENTION

In a SCADA system, data respectively gathered by a plurality of remote stations is supplied to a master station and supervisory control is performed on the basis of this data. Each of the remote stations includes a plurality of status-change detectors and a process which gathers data from the detectors and transmits this data to the master station.

The status-change detector in the remote station has the functions of supervising one or more plant apparatus or products of the plant apparatus and storing the occurrence of status-change and data of the plant apparatus. Further, one of the functions of these SCADA systems is communication with the remote station. Generally, these remote stations have been installed along a line at different times, resulting in that these remote stations are of different manufacturer and different processing capabilities. The different remote stations generally have different communication protocols which are required to communicate with these remote stations. A problem has developed in that these communication protocols require a labor-intensive effort in order to establish these different communication protocols within a single central system. One method of achieving these varying communication protocols is to burn software into ROM, creating circuitry software which includes the communication protocol with a specific remote station. This procedure is required to be repeated for each different kind of remote station located along the line and requiring communication to the central station. Thus, a lengthy process is required in order to achieve a communication link with the remote stations. Furthermore, this procedure does not lend itself well to situations where it is desirous of changing the data format in the remote station generally, in order to receive this new data format, it is necessary to again execute the above described procedure.

SUMMARY OF THE INVENTION

The present invention provides a seamless method and apparatus for achieving communication with a plurality of differing remote stations or devices. The present invention acquires data from the field devices for input into SCADA input points. This acquisition includes the determination of the sequence and the rate at which data values are acquired from the field remote devices. Furthermore, the present invention provides SCADA output points to be written to the remote devices. Furthermore, the present invention provides input and output point algorithms in order to filter the input data and detect alarm conditions from the remote devices. Further, the execution of block algorithms with specialized functions for example accumulator function, PID functions and special industry, for example, AGA function, American Gas Association provide greater flexibility. Furthermore, the present invention provides for storage and display to users of input, output and calculation values and alarm conditions. Furthermore, the present invention provides an apparatus and method for allowing custom supervisory algorithms to connect to remote devices without the necessity of knowing the connection path in which to communicate with the remote devices. This aspect is especially advantageous when it is necessary to achieve highly specialized data exchange which cannot be practically achieved through input and output points. The remote device may store data so that the SCADA system can catch up on communications that might have been impossible during a time when there was no communication with the remote device.

The present invention provides a communication monitor to provide a visual representation of the actual data transmitted and received between a channel driver and a remote device through a communication channel. This monitor used to diagnose problems and validate the correct operation of communication between the communication server and the remote device. This communication display eliminates protocol analyzers and allows an engineer to monitor the communication from a location remote to the communication channel for example at home. This monitoring from a remote location is valuable in maintaining a monitor of the communication channel, yet eliminating the need to physically install a protocol analyzer on the communication channel. Further, the present invention provides a method and apparatus for communication with a dialup device connected to the remote device so that a dedicated communication channel to the remote device is eliminated, achieving substantial savings in costs when the remote device does not require such dedicated communication channels. Advantageously, the present invention employs a dialup schedule such that the dialup device can be interrogated in accordance with a predetermined schedule. Additionally, this schedule can be interrupted by immediate request, achieving some of the flexibility of the dedicated communication channel.

The present invention provides a routing function to address a particular remote device without the need of knowing the communication connection path of the remote device thus, by specifying a topology specified when the SCADA system is created, and modified in accordance with the needs of the SCADA system, resulting in a transparent system. Furthermore, the database used by the SCADA system can be copied and modified off line allowing the database to be modified while the SCADA system employed online remains operating. Thus, by modifying the topology and the external I/O database off line, the changes to this off line topology and database have no impact on the operating SCADA system. When the changes are ready to be implemented, the modified topology and database can be easily transferred to the running system allowing minimal impact.

DESCRIPTION OF THE DRAWINGS

These and other features of the invention will be apparent to those skilled in the art from which the following detailed description of the invention, taken together with the accompanying drawings in which:

FIG. 7 is a diagram of the data configuration to for the dialup device.

DETAILED DESCRIPTION OF THE INVENTION

The present invention and its advantages are understood by referring to FIGS. 1–7 of the drawings like numerals being used for like corresponding parts of the various drawings.

Figure 1:
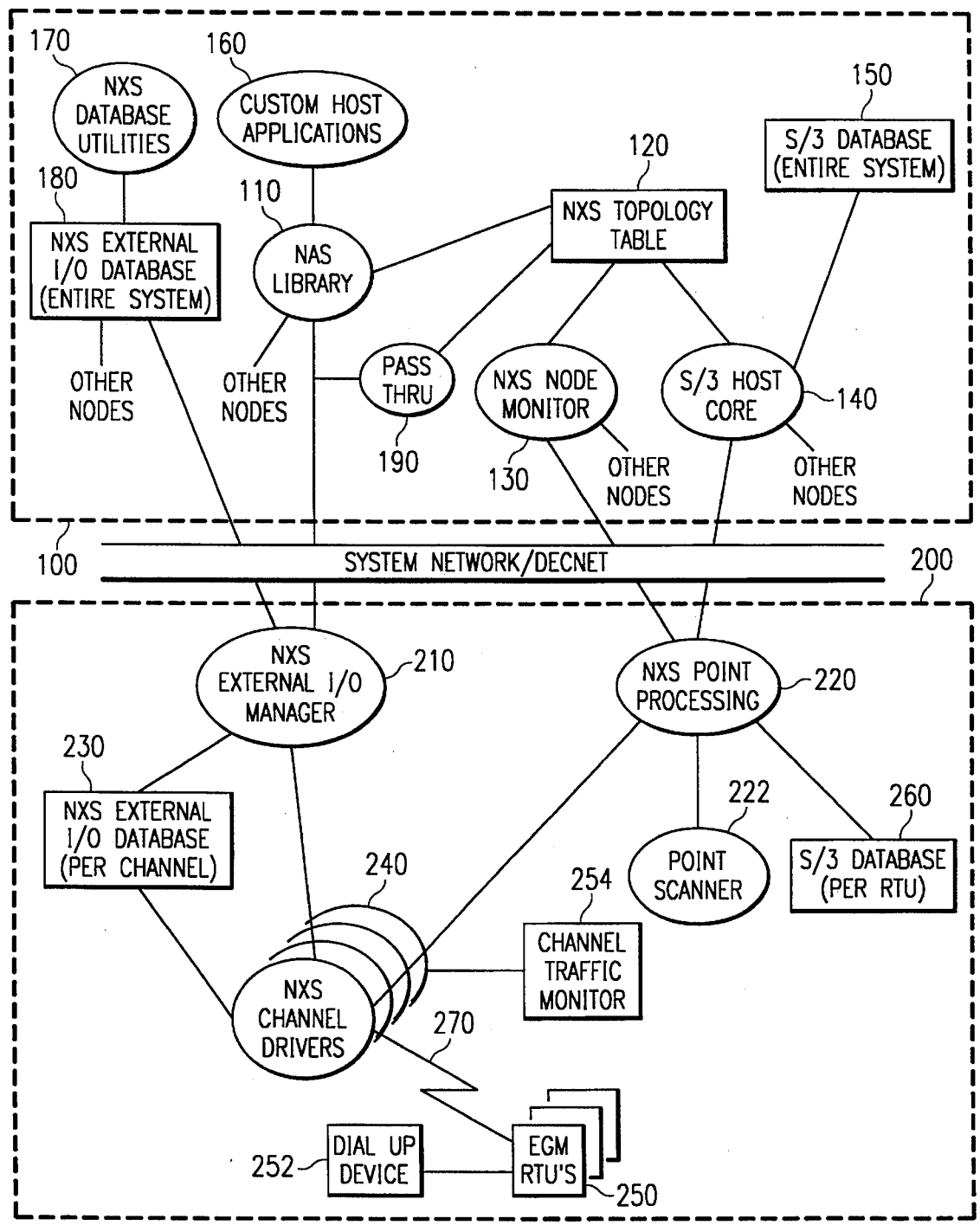
FIG. 1 is a system architecture of the SCADA system and the node system of the present invention.

FIG. 1 illustrates the system architecture of the present invention including a SCADA system 100 of the present invention and a node system 200 of the present invention. The system architecture includes modules, for example, module 160 which are connected to other modules, for example, Node Application Service (NAS) library 110 by a module connection, to transfer data between the two modules. The SCADA system and the node system 200 of the present invention may be each implemented on a microprocessor to provide a method and apparatus for interfacing the remote device 250 without the use of the proprietary hardware. The host 140 initializes the database, for example, the database 150, schedules and coordinate data from the remote devices 250 and processes this data from the remote device 250, for example in the point processing module 220. The node system 200 may include and external I/O manager 210, point processing 220, a point scanner 222, an external database 230, channel driver 240, remote devices 250, a dialup device 252, a channel traffic monitor 254, a database 260 and a communication channel 270. The external I/O processing includes the external I/O manager 210, the external I/O database 230 and the channel drivers 240. Each of the channel drivers 240 maintains a single communication channel 270 to the remote device 250. However, each of the communication channels 270 may be connected to many remote devices 250.

Figure 5:
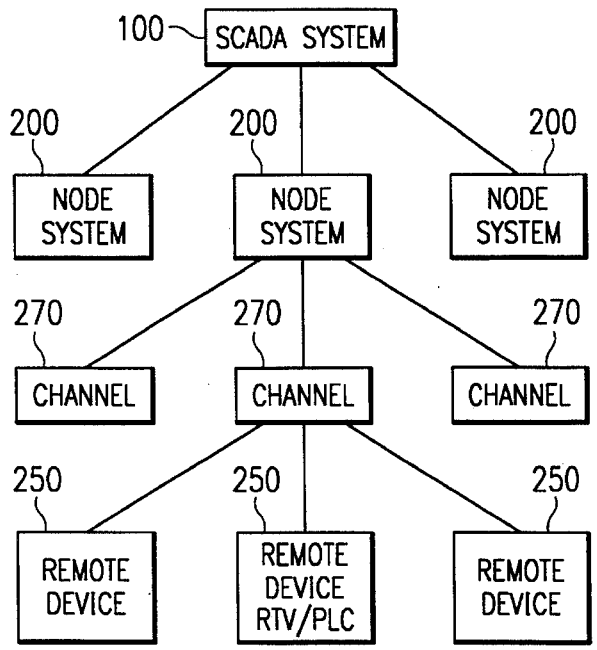
FIG. 5 is a diagram of the relationship between the SCADA system, the node system, the channels and remote device.

FIG. 5 illustrates the relationship of the SCADA system 100 to the node system 200, the relationship between the node system 200, the channels 270 and the channels 270 and remote devices 250.

Figure 2:
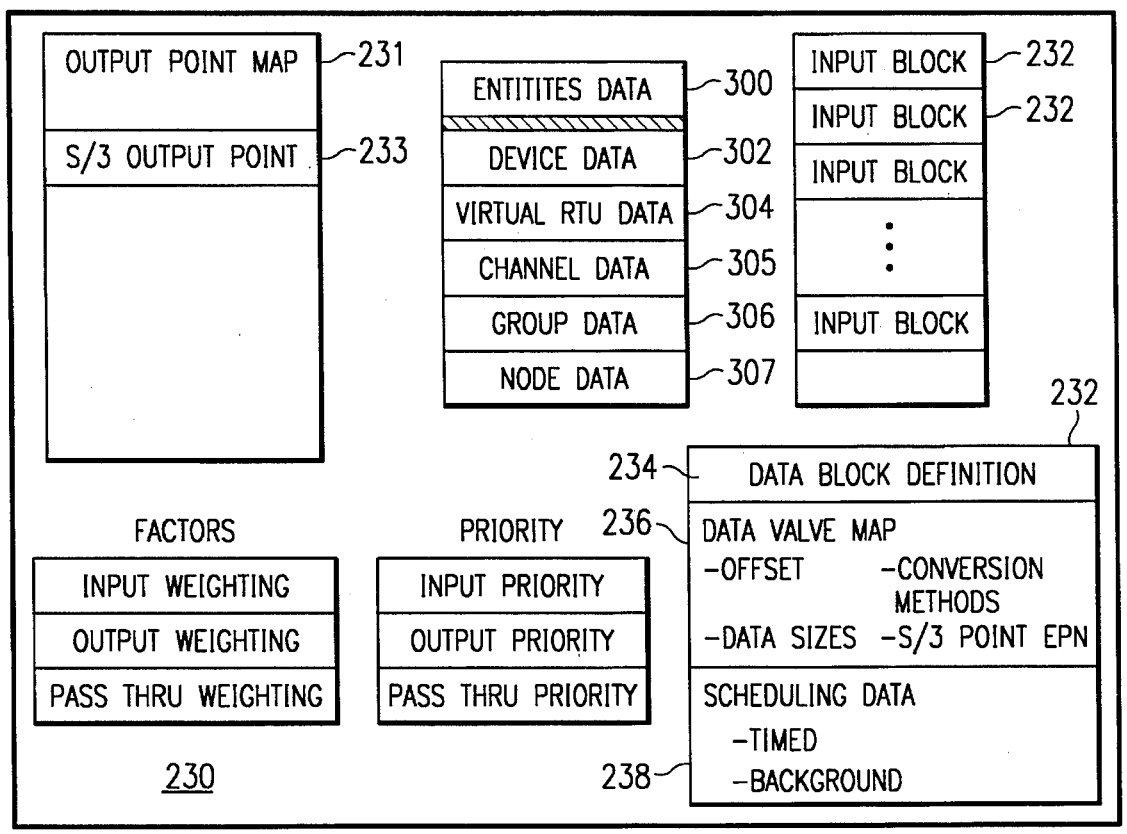
FIG. 2 is a diagram of the external I/O database of the present invention.

The communication channel 270 communicates with the remote device 250 to both input and output data to and from the remote device 250. The control of the communication channel 270 is facilitated by the data configuration of the external I/O database 230. The configuration of the database, which is created and maintained by utilities of database utilities 70, defines the mapping between the remote device 250 and the input and output points and the calculation point of the point processing module 220. Additionally, the external I/O database 230 defines the schedule for the periodic processing of inputs to the remote device 250. The external I/O manager 210 controls both the external I/O database 230 and the channel drivers 240. The external I/O manager 210 controls the starting and maintaining the transfer of data within the communication channel 270 by the channel drivers 240. Since the remote device 250 is by its very nature a unique element in that the protocol through the communication channel 270 must specifically address the remote device 250, a portion of the external I/O database 230 and the channel drivers 240 will contain information unique or dedicated to the remote device 250. These dedicated or unique portions are necessary since the characteristics of the remote devices 250, for example, the communication protocol used to communicate with the remote devices 250 are different from manufacturer to manufacturer. The channel driver 240 and the external I/O database 230 must include sufficient data so that this unique communication protocol can be obtained when it is necessary to utilize the communication channel 270 to transfer data to or from the remote device 250. Similarly, another portion of the external I/O database 230 and another portion of the channel drivers 240 will be unique to another remote device 250. The I/O processing of the channel drivers 240 includes input and output processing and pass-thru processing. Input processing corresponds to the transfer of data from the remote device 250 to the point processing module 220. Output processing corresponds to outputting data from the point processing module 220 which is to be written to the remote devices 250. In addition to input and output communication between the node system 200 and the remote devices 250, the SCADA system, particularly, the custom host application module 160 may communicate with the remote device 250 by pass thru processing of the interface device. The input processing of the node system 200 is facilitated by input block 230, as illustrated in FIG. 2, which are read from the remote device 250. The input blocks are stored in the external I/O database 230 and processed by the node system 200, the external I/O database includes a plurality of input blocks 232. Each input block 232 includes data block definition 234 which provide an indication the data that is specific to the remote device 250 so that the channel driver 240 may communicate with the remote device 250. For example, the block definition 234 may include that the remote device is to data that indicates read information from memory location 50 and 75 bytes of this information should be read from the remote device 250. Additionally, the input block 232 includes a data value map 236. The data value map 236 provides conversion information so that the data from the remote device can be converted to a common form for the node system 200. Since the remote device 250 may be from different manufacture, the conversion of data from these remote devices may be different. For example, the data value map may include an off-set to the data, data sizes, conversion methods and external point name. Further, the input block may include scheduling data 238 so that the remote device 250 may be periodically scheduled for data transmission. The scheduling data 238 may include sufficient data such that the input blocks are read from the remote devices at a known or periodic interval of time. The scheduling data 238 includes information such that the capacity of communication channel 270 may not be exceeded yet utilized to the fullest extent. Further, the scheduling data 238 includes data such that the channel drivers 240 recognize input blocks which have a high priority and must be transmitted through the communication channel 270 at a predetermined interval and the channel driver 240 may recognize that other input blocks are of less priority and should be transmitted through the communication channel 270 only during the times when the high priority input blocks are not utilizing the communication channel 270. The input blocks 230 include scheduling data so that the input blocks 230 may be classified as timed input blocks or background input blocks. A timed input block is assigned a fixed and predetermined interval at which the input block is transmitted through the communication channel 270. The timed input blocks are transmitted such that other operations such as output I/O and pass thru I/O are delayed if other input blocks are currently being transmitted through the communication channel 270. In contrast, the I/O of the background input blocks do not correspond to a specific time interval and these background input blocks are transmitted sequentially through the communication channel 270 as permitted by other traffic on the communication channel 270. The communication channel 270 may be defined such that only timed input blocks are transmitted or only background input blocks are transmitted to and from the remote device 250.

The time interval defines the amount of time between the start of two consecutive processing cycles for a particular input block. For example, the shortest time interval which could be set for an input block is dependent on the design of the particular channel driver 240. The node system 200 sets a minimum time interval of 10 milliseconds; however, a more realistic time interval may be longer than 10 milliseconds and might exceed one second. Furthermore, the input blocks 230 may be subject to an initial delay of time after the communication channel 270 has been initialized, but before the scheduling of the input blocks begin. The delay allows the processing of the input blocks to phased in over time avoiding communication channel congestion between input blocks.

In order to execute the processing of the input blocks, the channel driver 240 evaluates all of the input blocks which are to be sent from the remote device 270. By comparing the time interval with the actual time on the computer, the channel driver 240 determines if this particular input block is to be processed. If the input block was previously scheduled for the remote device 250, but not yet processed because the I/O processing has fallen behind schedule, the input block is not scheduled for a second I/O. Rather, the I/O request from the original input block 232 is left to be processed, eliminating the need for a redundant request. Thus, the rescheduling of the input block does not further overload the communication channel 270. The timed input blocks are not prioritized for a specific channel or for a specific remote device.

In contrast to the timed input blocks, the background input blocks are not processed with a specific time period. If the communication channel 270 is free from blocks, the next background input block is executed. The background input blocks may be assigned a priority value allowing these background blocks to be processed more frequently than other background input blocks. However, the timed input blocks are transmitted before even the highest prioritized background input block. However, the timed input blocks can be delayed by the processing of the background input blocks in that the length of time to process a background input block may overlap with the time that a time input block is to be processed. For example, if a background input block is being transmitted while a timed input block is to be transmitted.

The output processing of the node system 200 may be event driven in that there is no data transmitted to the remote device 250 until data is required to be written to the remote device 250. There are generally no periodic outputs to the remote device 250. As an output is generated from the point processing module 220, the output is transmitted to the channel driver 240 to be output to the remote device 250. The channel driver 240 obtains the output point 233 from the output point map 231 of the external I/O database 230. The output point map 231 defines how the channel driver 240 converts the information from the format of the node system 200 to the format of the remote device 250 for example the specific periodical protocol data. The external I/O database 230 includes data that describes the physical configuration of each of the remote devices 250 supported by node system 200 including the definition of the communication channels and the physical distribution of the remote devices on the channels.

The entity data 300 of the device data 302 defining the input blocks for this device, the output point map and addressing data permitting the interface device to communicate with the remote device on its communication channel 270. The entities data 300 includes virtual RTU data 304 in order to define valid remote devices 250 by specifying a list of these remote devices. The virtual RTU data 304 may include several remote devices 250 since these remote devices 250 comprising the virtual RTU may only transmit a few points of data. Additionally, the external I/0 database 230 includes channel data 305 to indicate to the channel driver 240, the communication channel 270 to communicate with the remote device 250. Further, the entity data 300 includes node data 307 identifying the computer which is operating the node system 200 since the host core 140 may be operating on a different computer which may be of different manufacturer. The entity data 300 are related in hierarchical fashion. Each node system 200 includes one or more channels. Each of the channels include one or more virtual RTUs and each of the virtual RTUs includes one or more remote devices. Furthermore, each of the remote devices includes an output point map 231 and one or more input blocks 232 so that the host application module 160 may communicate with the remote device 250, each node has a unique name, the S/3 host configures the external I/O database 230 at initialization time.

The point processing module 220 stores input blocks, stores calculation procedures for transferring the input blocks to outputs and maintains output points for value to be outputted to the remote device 250. Points include data which has been stored in the database. For example, the points include the analog input, digital inputs which correspond to the input from the remote devices, analog outputs and digital outputs which correspond to outputs to the remote device and general calculations and specialized calculations which corresponds to the calculations to be performed on the inputs.

In order to achieve flexibility such that a new SCADA system and node system can be prepared while the current node and SCADA system is being utilized, the external I/O database 180 includes data found both in the topology table 120 and the external I/O database 230. Thus, while the SCADA system is accessing the topology table 120 and the node system 200 is accessing the external I/O database 230, the user is able to prepare new data in the external I/O database 180. When it is desirous to change the data found in the topology table 120 and the external I/O database 230, the data found in the external I/O database 180 is simply copied to the topology table 120 and the external I/O database 230. As a result of this changes to the remote devices and channel 270 can be performed easily without great disruption of either the SCADA system 100 or the node system 200. The SCADA system points are stored in the database 150 while the node system points are stored in database 260. The point processing module 220 receives data from both the database 260 and the remote device 250, the point processing module 220 provides processing for input, output and calculation block points. The input point processing of the point processing module includes conditioning of input values before storage in database 260, for example, the elimination of small variations due to noise from the input values, conversion of the input value from the remote device 250 to an engineering value which may be reviewed by an engineer. Thus, the conversion converts the raw input values from the remote device 250 to values that are easily understood. For example, the raw sensor values for the remote device 250 are transformed into meaningful information understood by the user of the SCADA system. Further, the point processing module 220 provides limit checking on the converted value to assure that the remote device 250 is working properly and processing input blocks that accurately represent the data of the physical device being measured. Further, the point processing module 220 performs processing of output values, for example, limit checking of output values and the subsequent conversion of these output values to appropriate instrument values so that the remote device 250 may properly receive instrument values which accurately instruct the remote device 250.

The remote device 250 may be related to other remote devices 250 in that they may be connected along a common physical device, for example, a gas pipe and as a consequence of this relationship, certain calculations may be required that involve data received from a plurality of these remote devices 250. The data from the other nodes collected by the remote devices 250 are collected and transmitted to the point processing module 220 by the host core 140. Once the data from the other remote devices 250 have been transmitted to the point processing module 220, this data is used with the data received from the remote device 250. To provide a value indicative of the operation of the entire group of remote field devices the value of the point processing module 220 may be checked against predetermined limits of the database 260 and placed at an output point within the database 260. Thus, in this sense a point processing module not only can process data from the remote device 250 corresponding to the node of the point processing module 220, but also may appear as if it is a point processing module of other nodes. Associated with the point processing module 220, is a point scanner 222 and the database 260. The point scanner 222 executes the algorithm corresponding to the point processing module 220. The input points are processed as the point scanner 222 receives a new value and status for this new value from the external I/O database 230. Furthermore, the output points are produced by the point scanner 222 as new values are received from the calculation block or when a change is initiated through the control operator or by an application program from the custom host application module 160. The database 260 includes the points to be processed or particularly, the database 260 includes a record for each point. This record includes all of the parameters necessary to process the point including values such as alarm limits and conversion ranges. The host core 160 initializes the database 260 during this initialization procedure from the database 150 since the database 150 has all the points for all of the node systems. The point processing module 220 transmits to the host core 140. The current value from the remote device 250 and corresponding alarms which have been generated by the point scanner 222. This assures that the host core 140 thru the database 150 and the database 260 are synchronized in that each database 150 and 260 has the same information. The point processing module 220 maintains the data base 260 so that the remote device 250 of the node 200 is supported. The remote device may be assigned to other nodes at a future time. Furthermore, during run time, the host core module 140 transmits modifications to the point processing module 220. These modifications are effected in the database 260 during the next scan of the point scanner module 222. Furthermore, the host core module 140 performs periodic database synchronization to ensure that the database 260 corresponds to the information of the database 150. The point processing module 220 receives purge requests from the host core module 140 in order to remove entries in the database 260 or to have a new entry in the database 260 entered.

The point processing module 222 transmits current values of the remote device 250 to the host core module 140 after they have been processed by the point processing module 222. The point scanner 222 generates alarm signals which are transmitted to the host core module 140. The host core module 140 acknowledges receipt of the alarm. These alarm signals are sent to the host core module 140 by the point scanner module 222 until the host core module 140 acknowledges receipt of the alarm signal. The alarm signals are transmitted to the host core module 140 at a periodic interval until acknowledgment. The channel drivers 240 control the processing of the inputs and outputs of the remote device 250 and pass-thru data by control data. This control data may have portions that are unique to the channel driver 220; however, certain portions of the control data of the control drivers are the same for each node 200. The channel driver 240 may have multiple I/O requests to transmit data between the channel driver 240 and the remote device 250 for a communication channel 270. However, the channel drivers are limited in the number of outstanding I/O operations per channel. The channel driver 240 is limited by the maximum I/O operations requested per remote device 250, the maximum number of I/O operations requested per virtual RTU and the maximum I/O operations requested per channel. Generally, the input operations, output operations and pass-thru operations through the communication channel 270 are interleaved to facilitate the operation of the channel drivers 240. However, the rules controlling the input operations, output operations and pass-thru operations can be determined during the initialization of the channel driver 240. Additionally, the rules controlling the input operations, the output operations and the pass-thru operations may be configurable through utilization of the external I/O database 230 by setting the input priority, the output priority and pass-thru priority. The input priority is the priority relative to the output and pass-thru priority; the output priority is the priority relative to the pass-thru priority and the input priority and the pass-thru priority is the priority relative to the input priority and the output priority. These priorities are illustrated as fields located in the external I/O database 230. One rule may be that the higher priority operations are executed first; however, if an operation is already in progress and an operation of a higher priority is requested, the operation in progress is completed before the higher priority operation begins. Additionally, as illustrated in FIG. 2, the external I/O database 230 includes weighting factor fields to arbitrate between two types of operations having the same priority occurring at the same time. For example, if the input priority and the output priority is the same, the selection of the input operation or the output operation is made based upon the weighting factors. These weighting factors provide a relative preference between the input operations, the output operations and the pass-thru operations. If for example, both the input and output operations have the same priority and both the input operations and the output operations are ready for processing and the input operations have a weighting factor of one while the output operations have a weighting factor of two, under these assumptions, one input operation is processed followed by two output operations, followed by one input operation followed by two output operations.

Pass-thru operations are operations that are initiated by the host application module 160 and it is to be transmitted to the remote device 250. Thus, the communication between the host application module 160 and the remote device 250 must pass thru the node system 200. Since the remote devices 250 may be reassigned as a result of a communication channel 270 failure, it is necessary to provide a certain degree of independence between the host applications module 160 and the remote device 250 in that the necessary protocols required for communication through the communication channel 270 must be independent of the host application module 160. In order to achieve this seamless communication with the remote device 250, the host application module 160 sends messages including a name of the remote device 250 to the pass-thru function 190. The message may include data. However, this data does not have a point within the database 260 and no processing is required by the point processor 220.

Figure 6:
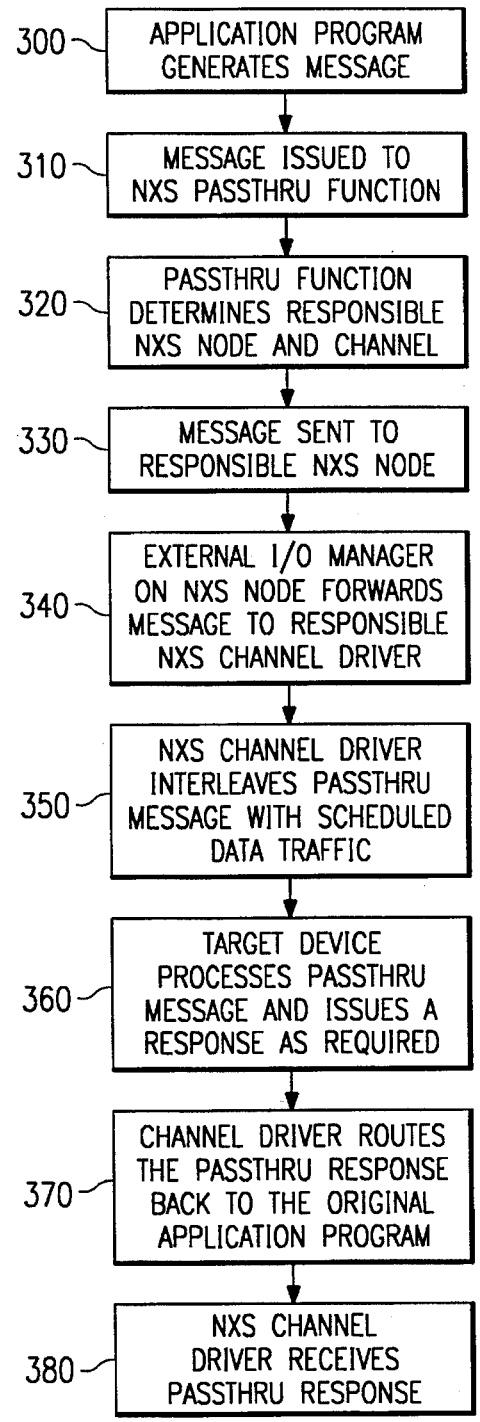
FIG. 6 is a flow chart of the pass-thru feature of the present invention.

FIG. 6 illustrates the sequence of steps in order to route the message from the host application module 160 to the remote device 250. At step 300 the application program within the host application module 160 generates the message to be sent to the remote device 250. At step 310, the message is issued to the pass-thru function 190, the topology table 120 includes a conversion table in order to convert the name to the particular node and communication channel 270 that is connected to the remote device 250. At step 320, the pass-thru function 190 determines the node system 200 and the communication channel 270 that the remote device 250 is connected to. At step 330, a message is sent to the external I/O manager 210. At step 340, the external I/O manager 210 of the node system 200 forced the message to the channel driver 240. The channel driver 240 interleaves the pass-thru message with scheduled data traffic at step 350. At step 360, the remote device 250 receives and process the pass-thru message and issues a response if required. The channel driver routes the pass-thru response back to the original program in exactly the same order as the message has been sent in step 370. More specifically, the external I/O manager 210 sends the pass-thru response message to the pass-thru 190, the pass-thru 190 converts the node and channel to a name and the message is converted, the pass-thru response is converted to include the name and the host application module 160 receives the pass-thru response identified by the name.

As was discussed previously, the external I/O database 180 can prepare information located within the external I/O database 230 and the topology table 120. Specifically, the following changes can be made off-line through the off-line external I/O database 180. The external I/O database 180 can remove an entity from the external I/O database 230 by stopping processing of the entities and all entities which depend upon the entity to be deleted. Thus, a device can be removed from a virtual remote device, a remote device can be removed from a channel, a channel can be deleted from a node 200.

In addition to deletions, the node system 200 can recognize the addition of an entity to the external I/O database 230. As the entity is added to the external I/O database 230, processing is begun for the new entity and all the entities which depend the added entity. This applies to a remote device for a virtual remote device. The addition of a remote device to a channel and the addition of a channel to a node. Furthermore, the definition of the entity can be modified. To modify the entity definition the processing of the entity must be stopped along with all the entities which depend on it. The modified entity definition is placed in the external I/O database 230 and the processing for the modified entity is begun. For example, the baud rate of a channel and an input block for remote device may be modified. The changes for example of input blocks or virtual RTUs do not; effect other input blocks or virtual RTUs. Furthermore, a channel could be added to a group without affecting the other existing channels within the node system. Thus, a portion of the node system is changed while leaving the remaining portions of the node system operating. In addition to the above-described temporary changes to the external I/O processor processing could be implemented. These can be made to fulfill transient requirements as well as to study the effects of post change prior to making permanent modifications. For example, an input block can be queued for an immediate processing regardless of its indication as being timed or background. This change has no effect on further scans of the input block. Furthermore, temporary changes can be made to the interval of the timing of the input block and the priority of background input block and these changes can be left in operation until the next shut down and restart of the system or the next update of the external I/O database 230. Furthermore, entities can be temporarily placed in or out of service by either suspending or activating all I/O operations for that entity.

In some cases the remote devices 250 may be connected to the channel drivers through communication channels 270 which are dedicated to the remote device 250. However, the dedication of the communication channel 270 is expensive in that the physical length of the communication channel 270 may be quite long since the remote device 250 may be located several hundred or thousand miles from the channel driver 240. In order to provide for a more economical solution to the long expensive communication directly dedicated communication channel 270, a dialup device 252 may be employed to connect the communication channel 270 only upon request or during predetermined periods of time. The establishment of the connection of the communication channel 270 by the dialup device 252 is especially advantageous when the data to and from the remote device 250 is not required on a relatively frequent basis. The dialup device 252 may be connected to a single remote device 250 or may be connected to a series of remote devices. The dialup device 252 may be connected and disconnected to the channel driver 240 at periodic and/or fixed time intervals. Thus, the dialup device 252 is activated, for example, every hour of the day. Once connected, the remote device 250 remains connected to the channel driver by the dialup device 252 for a predetermined period of time. After this predetermined time period has occurred, the remote device 250 is disconnected upon completion of the last I/O operation. The parameters necessary to control the connection and disconnection are located in the external I/O database 230. This periodic operation of the dialup device 252 can be disabled, and the custom host application module 160 can directly request that the dialup device 252 be activated to enable the connection of the communication channel 270 with the remote device 250. When the dialup device 252 is connected to the channel driver 240, the normal I/O operations as described above may be implemented. However, while the dialup device 252 is not enabled, the following rules may apply. The input blocks 232 are not processed by this entity 300. Output requests are not accepted and for example an I/O BAD status is written to the output point of the point processing module 220. Lastly, pass-thru request to the entity are dropped and the custom host application module 160 is notified that the remote device 250 is not presently connected to the channel driver 240.

Furthermore, the channel driver 240 may process communication errors with the remote device 250. The communication errors may be manifested in terms of time outs and retry processing to be applied to the communication channel 270. The time out and retry parameters are stored in the external I/O database 230 as well as statistics to provide for a record of errors, time outs and retries. The channel driver 240 may indicate the status of the communication channel 270 as off-line suspending input operations and dropping output operations and pass-thru operations. The channel driver 240 may provide a periodic trigger mechanism to determine the status of the remote device 250. Thus, if the remote device returns to normal service, the periodic trigger mechanism can detect this condition and resume input operations, output operations and pass-thru operations for the remote device 250. The channel driver may control the communication channel 270 so that the virtual or actual remote device 250 is available or unavailable for operations. Example 1 illustrates a portion of the standard fields that are implemented in the external I/O database 230 during the implementation of each of the channel drivers 240.

Node Fields
    Node Name
    List of RTUs not referenced in External I/O Database
    List of Groups
    Channel Fields
    Channel Name
     Service State (enabled or disabled)
    Protocol
    Channel Type (full period or dialup)
    Channel Device Name
    Channel Baud Rate
    Channel Timeout
    Channel Retry Limits
    Good/Bad Channel Limits
    List of Virtual RTUs
    Virtual RTU Fields
    Virtual RTU Name
    Service State (enabled or disabled)
    List of Devices
    Device Fields
    Device Name
    Service State (enabled or disabled)
    Device Address
    Device Unit Number
    Device Timeout
    Device Retry Limits
    Output Point Map
      List of S/3 Point EPNs
      List of corresponding device-specific data locations
    List of Input Blocks
      For each Input Block
        Input Block Name
        Block type: timed or background
        Interval and phase for timed block
        Priority for background block
        Device-specific data block definition
        List of S/3 Point EPNs
        List of corresponding device-specific data locations

EXAMPLE 1

Figure 3:
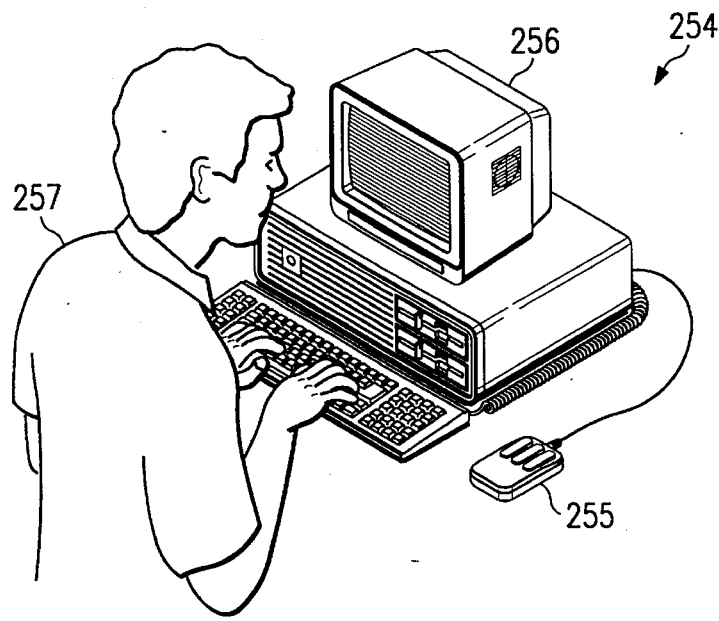
FIG. 3 is a perspective view of a display of the communication channel of the present invention.
Figure 4:
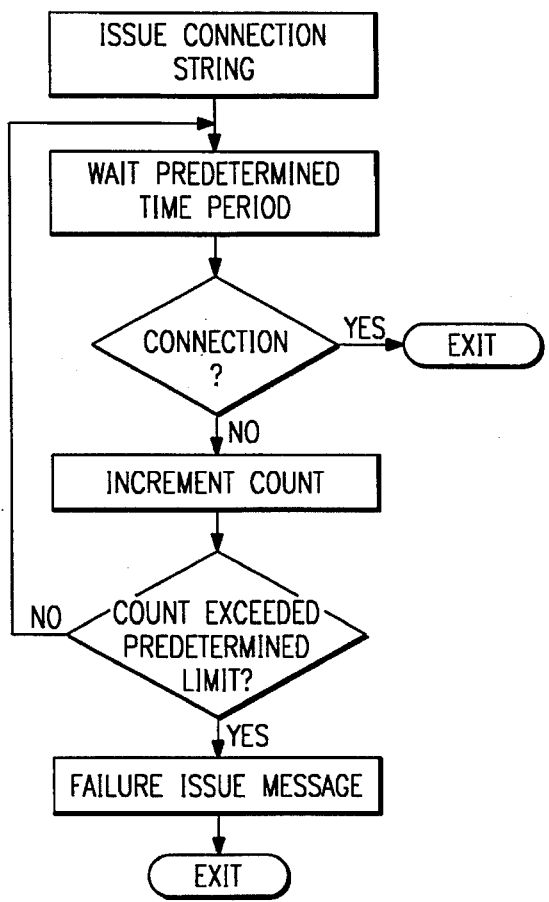
FIG. 4 is a flowchart of the present invention.

The database utilities module 170 includes utilities to add, modify, rename or delete a node definition and channel definition. Additionally, the utilities of the database utility module 170 includes utilities to add, modify, rename or delete a virtual remote device or device definition. Furthermore, a channel traffic monitor 254 provides a real-time display 256 and retention of the communication operation occurring on a communication channel 270. The channel traffic monitor 254 includes a disk file to store this traffic data. FIG. 3 illustrates one example of a channel traffic monitor 254. The user 257 inputs and receives data to a workstation or the channel traffic monitor 254 having a monochrome or color monitor 256. The traffic monitor 254 is provided with an enable and disable function in order to enable or disable the channel traffic monitor 256. The user 257 may specify the name of the channel to be monitored, the name of the engineering terminal where the data is to be displayed and the name and maximum size of the disk file, for example, within the channel and traffic monitor 254. The display format on display 256 may be either in hexadecimal or ascii. The node system 200 provides the custom host application module 160 with the functions to schedule a specific and nonperiodic dialup of the dialup device 252. The dialup device may be dialed up to 24 hours in advance of the requested connection line. Furthermore, the custom host application module 160 may request that an immediate connection be established with the remote device 250 through the dialup device 252, an output or field modification from the system can initiate the connection of the remote device through the dialup device 252. However, such a connection whether requested periodically, immediately or through the library service may initially fail to make a connection with the remote device 250. After the channel driver 240 issues a connection string to the modem equipment of the dialup device 252, the channel driver 252 waits for a predetermined amount of time which has been specified by a timeout parameter. If the connection to the dialup device 252 is not completed within this predetermined amount of time specified by the timeout parameter, the connection attempt is cancelled. The channel driver 240 then immediately re-initiates the above described procedure; the channel driver 240 retries a predetermined number of times in accordance with the retry limit. Once the number of retries reaches the retry limit, the channel driver 240 ends the retry procedure. FIG. 4 illustrates the retry procedure. As the channel driver 240 attempts to establish a communication channel 270 to the remote device 250 as a result of the normal schedule. As the immediate retry procedure is exhausted through the retry limit, an attempt to establish the communication channel 270 in the future is scheduled by the channel driver 240. As this future time arrives and the establishment of the communication channel 270 fails, the channel device 270 may reschedule attempt reschedule as long as the number of failed attempts does not exceed the number corresponding to the rescheduling retry limit.

In addition to attempting to establish a communication channel 270 with the dialup device 252, the channel driver 240 may need to resolve conflicts between different dialup devices attempting to obtain a connection when the channel device 240 can only support maintaining a connection with only one dialup device. Under these circumstances, it may be necessary to establish rules which define how the channel driver 242 may resolve these conflicts. One such set of rules is described. If the channel driver 240 has reached a lock state while a connection is in progress the channel device 240 may receive another request for a connection. One alternative is to hold the new request in abeyance until the existing connection has been completed. A second alternative is to disconnect the existing connection, realizing that this connection has not completed and then request a new connection. However, the channel driver 240 may be provided with additional rules so that the channel driver can control the disconnection and connection of the communication channel 270 with the dialup device 252. If the channel driver 240 determines that the connection has reached a lock state, the channel 270 is not disconnected by the channel driver 240 as a new request for connection is made. Furthermore, if the new connection request is from a scheduled request for connection, the channel driver 240 will not force the disconnection even though the connection being processed has not reached a locked state. However, if the channel driver 240 receives a request for an immediate connection, for example, through the host application module 160, the existing connection will be forcibly disconnected as long as the existing connection has not reached the lock state. If the existing connection has in fact reached the locked state, the request for immediate connection is rejected. If the existing connection is forcibly disconnected, the previous connection is not rescheduled despite the fact that the existing connection has been established but not yet reached the lock state. If the channel driver 240 receives two connection requests at the exact same time, the channel driver 240 resolves this conflict by obtaining the priority assigned to each request to determine the connection request to process first. If both the connection requests have the same priority, then the order of processing is undefined. The channel driver 240 may disconnect the communication channel 270 to the dialup device 252 when the communication channel has been connected for a maximum predetermined time. The maximum predetermined time period may be assigned to the channel driver 270 and specified in seconds. The adjustment of the remaining duration for an existing connection may be adjusted, either increased or decreased, by a library call to a function contained in the NXS application support library. The duration of the communication channel 270 may be a permanent connection and indicated by a connection duration of zero. As discussed, the connection of an existing connection which has not entered the lock state may be terminated by a request for an immediate dialup connection. Furthermore, when the connection duration has not yet expired, yet there are no I/O requests, the connection can be disconnected. The host application module 160 may request that the channel driver 240, by using an appropriate library call, disconnect the communication channel 270 whether or not the connection has entered the lock state. The communication channel 270 can be inadvertently disconnected as a result of the failure through the communications network. Responsive to disconnection of communication channel 270, the channel driver 240 may be set to a predetermined state after the disconnection. The state of all the point processing points may be set to a status of OLD when the communication channel 270 is disconnected.

The use of the dialup device 242 and the non-continuous implementation of the communication channel 270 results in the need to process the input blocks in accordance with different rules than if the communication channel 270 is continuously established. One alternative to processing the input blocks is to process the timed and background block as with the continuous communication channel. However, as the external I/O manager 210 access the input block schedule when the communication channel 270 has not been established, thus the processing of the input blocks does not start from the beginning of the list of input blocks when the connection is finally established. Another alternative is to implement one pass processing of the input blocks such that the input blocks corresponding to the currently connected dialup devices 252 are processed during this pass. The scheduling of timed and background input blocks is not performed in that there are no distinctions between input blocks based on the timed or background criteria. Another alternative is not to process the input blocks for the connected remote devices. The output of the output processing and database field modifications are transmitted to the channel drivers 240 regardless whether or not the communication channel 270 is established. If the communication channel 270 is connected to the dialup device 250, the execution of the output is in the same manner as if the communication circuit 270 is continuously connected. However, while the communication channel 270 is disconnected, the channel driver may drop the output of the output points or the database field modification if the communication channel 270 has not been connected, or the channel driver 240 may establish a connection to the dialup device 252 in order to execute the output of the output processing or database field modification.

With respect to a pass-thru request, the channel driver 240 may process the pass-thru request only if the dialup device has been previously connected. The channel driver 240 may reject pass-thru requests received while the communication channel 270 is not established. The host application module 160 in order to transmit the pass-thru request to the remote device must either wait to a scheduled connection or use a library call to request a special dialup connection in order to perform the pass-thru request.

FIG. 7 illustrates the scheduling entries for the dialup of the communication circuitry 270. FIG. 7 illustrates the dial up schedule including the connection string, the connection time, the repeat interval, the connection priority, the connection attempt timeout on retry limits, the reschedule interval, retry limit and priority, the connection lock, the connection duration, the input block action and auto disconnect. The connection string is the telephone number, for example that is used to establish the connection with the dialup device 252. The connection string may include multiple entries of the telephone number. The connection time is specified as hours and minutes (HHMM) into the day. The connection time determines the actual time of day that connection is to be made to the dialup device 252. The repeat interval is used in conjunction with the connection time to facilitate scheduling of periodic connections. The repeat interval determines the period of time after the connection time that the connection is repeated. If the repeat interval is set to zero, then the connection is only made once at the connection time. The connection priority determines the relative priority when conflicts occur for schedules at the same time. The connection timeout and retry limit controls the channel driver 240 to determine how long the channel driver 240 waits before attempting to reconnect to the dialup device 252 so that the channel driver 240 only attempts to reconnect as long as the retry limit has not been exceeded. The reschedule interval and retry limit provides the interval between the time when a connection attempt is abandoned and another attempt is rescheduled. The retry limit sets the number of times the connection is rescheduled. Once the retry limit has been exceeded no further attempts are made. The connection priority resolves conflict during rescheduling attempts. The connection lock provides an indication as to whether or not the connection to the dialup device 252 has entered the lock state. The connection duration specifies the amount of time that the channel driver 240 maintains the communication channel 270 with the dialup device 256. The input block action specifies the type of processing for the input blocks that is performed while the communication channel 270 is established between the channel driver 240 and the dialup device 256. For example, an input block action of one indicates normal processing as defined by a dedicated communication channel. An input block action of two indicates one pass processing in that the input blocks are processed for each device once the dialup device has been connected. An input block action of three indicates that no input blocks are processed unless explicitly requested through a demand scan. Furthermore, the auto disconnect indicates whether or not the connection through the communication channel 270 should be automatically disconnected as all I/O requests for the remote device 250 is completed. As the connection string is specified so that the channel driver 240 connects the dialup device 252, the dialup device may be connected to one or more remote devices which have been interconnected. Furthermore, if the communication channel 270 is a dialup channel, an additional display screen may be provided to support and display the configuration of the dialup schedule for a single channel. It is with the scope of the present invention to change the dialup schedule by the display screen. Furthermore, the display screen may show all of the connections that may be made during the day in accordance with the entire dialup schedule. The dialup schedule displayed may be resorted such that the display screen displays each connect and connection priority in accordance with the time of day. The identification of the dialup schedule could be made through the connection screen or through a dialup device name. Furthermore, access to the screen may be with or without validation. The host application module 160 may request a connection during a predetermined time interval; however, if the predetermined time interval has been set to zero, the channel drivers may interpret this as an immediate request for connection. Furthermore, a request may be made for disconnection of the communication channel 270. However, if the communication channel 270 is not currently connected to the dialup device 250, the disconnection request is rejected. Furthermore, the host application module 160 may reset the remaining duration of the time that the communication channel 270 is connected. If the communication channel 270 is not currently connected when the request for duration is made, the request is rejected.

What is claimed is:

1. A status change data gathering apparatus comprising:
 a status change detector for detecting and transmitting data representing changes in a process or apparatus;
 a first processor connected to said status change detector through a communication channel for receiving and collecting said detected data representing said changes in said process or said apparatus;
 a second processor connected to said first processor, said second processor communicating to said status change detector through said first processor independently of said communication channel.

2. A status change data gathering apparatus as in claim 1, wherein said second processor communicates with said status change detector to collect said detected data.

3. A status change data gathering apparatus as in claim 1, wherein said second processor communicates with said status change detector by the communication procedure of said first processor.

4. A status change data gathering apparatus comprising:
 a status change detector for detecting and transmitting data representing changes in a process or apparatus;
 a first processor connected to said status change detector through, a communication channel for receiving and collecting said detected data representing said changes in said process or said apparatus;
 a second processor connected to said first processor, said second processor communicating to said status change detection by controlling said first processor to communicate with said status change detection through said communication channel.

5. A status change data gathering apparatus as in claim 4, wherein said second processor communicates with said status change detector to collect said detected data.

* * * * *